March 6, 1928.

N. J. GENDRON

PLIERS

Filed March 4 1926

1,661,365

Inventor
N. J. GENDRON,

By  J. P. Lorin

Attorney

Patented Mar. 6, 1928.

1,661,365

UNITED STATES PATENT OFFICE.

NAPOLEON J. GENDRON, OF SEATTLE, WASHINGTON.

PLIERS.

Application filed March 4, 1926. Serial No. 92,305.

This invention relates to an improvement in pliers, designed particularly for use in connection with the removal of cotter pins and the like.

The invention comprises specially formed plier jaws which may grip the head of the cotter pin, and by an appropriate movement of the plier, exert a sufficient leverage thereon to withdraw the cotter pin.

The invention is illustrated in the accompanying drawings, in which.

Figure 1:
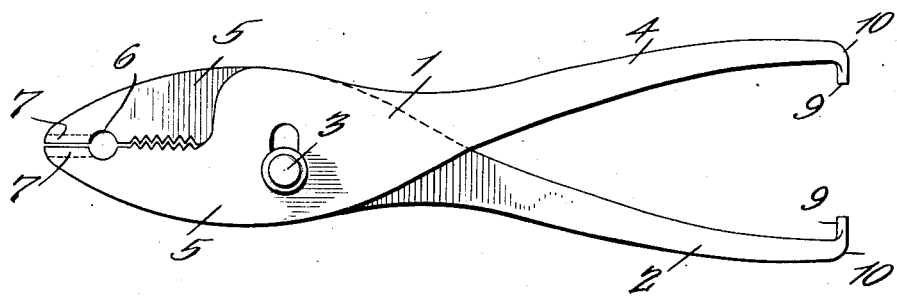
Fig. 1 is a view in elevation of the improved pliers.
Figure 2:
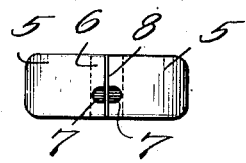
Fig. 2 is an end view of the same.
Figure 3:
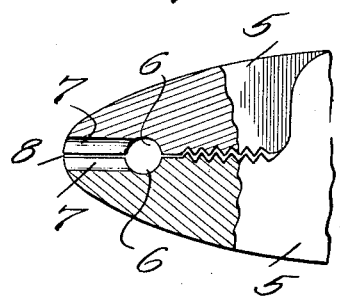
Fig. 3 is an enlarged broken longitudinal section of the same.

The improved implement is in plier form, comprising members 1 and 2 connected by the usual pivot pin 3 to provide handles 4 and jaws 5. The meeting faces of the jaws are each provided with a recess 6 arranged transverse of said jaws and adapted to register when the jaws are closed, and said meeting faces of the jaws are further provided with recesses 7 arranged longitudinally of the jaws 5, said recesses opening through the ends of the jaws at one end and merging into the recesses 6 at the opposite end. The recesses 7 are of somewhat greater depth than width so that when the jaws are closed, an elongated opening 8 is provided at the ends of the jaws, which it will be further noted is arranged closer to one side edge of the jaws than to the other, as clearly evident in Fig. 2.

In the use of the device, the head of the cotter pin is grasped in the opening 8 and the jaws closed thereon, and the implement as a whole tilted on one edge or the other to provide the desired leverage for the removal of the pin. It is of course apparent that this leverage may be varied as will suit the particular requirements by using the edge closer to or farther from the opening 8, as the fulcrum.

The free ends of the handle portions 4 may, if desired, be provided with inturned hooks 9 of a size to permit them to be inserted in the usual opening in the cotter pin head, the rounded portions 10 of the handles immediately adjacent the hooks serving as the fulcrum, through which leverage may be exerted on the cotter pins after the insertion of the hooks in the openings of the heads thereof.

What is claimed as new, is:—

An implement for withdrawing cotter pins comprising interconnected jaws having flat meeting surfaces throughout their full width, save that said jaws are each formed with a longitudinally arranged recess opening through the free end of the jaw, the recesses being closer to one side of the jaws than to the other, said jaws being further formed with a transverse semicylindrical recess which extends entirely across the jaw and into which the longitudinally ranging recesses merge, the semicylindrical recesses together forming a circular recess to substantially accommodate the head of a cotter pin and permit of access to the head of said cotter pin from opposite sides of the jaws, the disposition of the longitudinal recesses at different distances from the sides of the jaws providing for an increased leverage on the cotter pin as compared with a central disposition of such recesses.

In testimony whereof I affix my signature.

NAPOLEON J. GENDRON.